US011064506B2

(12) United States Patent
Lee et al.

(10) Patent No.: US 11,064,506 B2
(45) Date of Patent: *Jul. 13, 2021

(54) METHOD AND APPARATUS FOR TRANSMITTING AND RECEIVING FEEDBACK FOR COOPERATIVE COMMUNICATION SYSTEM

(71) Applicant: Samsung Electronics Co., Ltd., Suwon-si (KR)

(72) Inventors: Hyojin Lee, Seoul (KR); Juho Lee, Suwon-si (KR); Kiil Kim, Yongin-si (KR); Younsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,431

(22) Filed: Jan. 9, 2020

(65) Prior Publication Data

US 2020/0154447 A1    May 14, 2020

Related U.S. Application Data

(63) Continuation of application No. 15/924,996, filed on Mar. 19, 2018, now Pat. No. 10,536,952, which is a
(Continued)

(30) Foreign Application Priority Data

Sep. 23, 2011  (KR) .................. 10-2011-0096603

(51) Int. Cl.
*H04W 72/08* (2009.01)
*H04L 5/00* (2006.01)
(Continued)

(52) U.S. Cl.
CPC .......... *H04W 72/085* (2013.01); *H04B 7/024* (2013.01); *H04B 7/0626* (2013.01);
(Continued)

(58) Field of Classification Search
CPC . H04W 72/085; H04W 24/10; H04W 72/042; H04W 48/18; H04B 7/024;
(Continued)

(56) References Cited

U.S. PATENT DOCUMENTS 8,687,555 B2    4/2014  Ko et al.
8,767,570 B2    7/2014  Ong et al.
(Continued)

FOREIGN PATENT DOCUMENTS

KR    10-2010-0117522 A    11/2010

OTHER PUBLICATIONS

Panasonic, High Level Views of CoMP Schemes, 3GPP TSG RAN WG1 Meeting #63bis, R1-110572, Jan. 17-21, 2011.
(Continued)

*Primary Examiner* — Kiet Tang
(74) *Attorney, Agent, or Firm* — Jefferson IP Law, LLP

(57) ABSTRACT

A method and an apparatus for transmitting and receiving a feedback signal in a cellular mobile communication system is provided. The method of transmitting feedback in a Cooperative Multi-Point (CoMP) system, includes receiving feedback set information including allocation information of a Channel Status Information Reference Signal (CSI-RS) transmitted for estimating a channel of a User Equipment (UE), receiving IDentification (ID) information for identifying a CoMP set including CSI-RS allocation information from a cell operating in a CoMP mode, extracting the CoMP set using the ID information and a feedback set, detecting a first feedback mode and first feedback timing with a first CSI-RS not included in the CoMP set among CSI-RSs
(Continued)

included in the feedback set, and generating and transmitting feedback with respect to the first CSI-RS according to the detected first feedback mode and the first feedback timing.

16 Claims, 8 Drawing Sheets

Related U.S. Application Data continuation of application No. 15/234,574, filed on Aug. 11, 2016, now Pat. No. 9,924,528, which is a continuation of application No. 14/587,510, filed on Dec. 31, 2014, now Pat. No. 9,420,596, which is a continuation of application No. 13/625,113, filed on Sep. 24, 2012, now Pat. No. 8,942,125.

(51) Int. Cl.
*H04L 25/02* (2006.01)
*H04B 7/024* (2017.01)
*H04B 7/06* (2006.01)
*H04W 24/10* (2009.01)
*H04W 72/04* (2009.01)

(52) U.S. Cl.
CPC .......... *H04L 5/0035* (2013.01); *H04L 5/0048* (2013.01); *H04L 25/0204* (2013.01); *H04L 5/0007* (2013.01); *H04W 24/10* (2013.01); *H04W 72/042* (2013.01)

(58) Field of Classification Search
CPC . H04B 7/0626; H04L 5/0048; H04L 25/0204; H04L 5/0035; H04L 5/0007; H04L 1/0026; H04L 25/0224
See application file for complete search history.

(56) References Cited

U.S. PATENT DOCUMENTS

| | | | |
|---|---|---|---|
| 8,942,125 B2 | 1/2015 | Lee et al. | |
| 9,420,596 B2 | 8/2016 | Lee et al. | |
| 2010/0291940 A1 | 11/2010 | Koo et al. | |
| 2010/0309996 A1 | 12/2010 | Lim et al. | |
| 2010/0322180 A1 | 12/2010 | Kim et al. | |
| 2010/0322351 A1 | 12/2010 | Tang et al. | |
| 2012/0046033 A1 | 2/2012 | Ko et al. | |
| 2012/0051257 A1 | 3/2012 | Kim et al. | |
| 2012/0093089 A1 | 4/2012 | Park et al. | |
| 2012/0108255 A1 | 5/2012 | Jo et al. | |
| 2012/0134273 A1* | 5/2012 | Bhattad | H04L 5/0048 370/241 |
| 2012/0176884 A1 | 7/2012 | Zhang et al. | |
| 2012/0320775 A1 | 12/2012 | Lee et al. | |
| 2012/0320832 A1 | 12/2012 | Kim et al. | |
| 2013/0028109 A1* | 1/2013 | Jongren | H04W 72/1226 370/252 |
| 2013/0039199 A1* | 2/2013 | Liao | H04B 7/024 370/252 |
| 2013/0077581 A1 | 3/2013 | Lee et al. | |
| 2013/0163461 A1 | 6/2013 | Kim et al. | |
| 2013/0250788 A1 | 9/2013 | Kim et al. | |
| 2013/0308542 A1 | 11/2013 | Kang et al. | |
| 2013/0322278 A1 | 12/2013 | Lee et al. | |
| 2013/0344909 A1 | 12/2013 | Davydov et al. | |
| 2014/0112184 A1 | 4/2014 | Chai | |
| 2014/0153427 A1 | 6/2014 | Seo et al. | |
| 2015/0117385 A1 | 4/2015 | Lee et al. | |
| 2015/0358065 A1 | 12/2015 | Lee et al. | |
| 2016/0242195 A1 | 8/2016 | Kwon et al. | |
| 2016/0285652 A1 | 9/2016 | Seo et al. | |

OTHER PUBLICATIONS

Alcatel-Lucent Shanghai Bell, Alcatel-Lucent; CoMP Phase 2 Evaluation for Scenario 3: FDD Downlink, Athens, Greece, R1-112413, Aug. 22-26, 2011.
Hitachi Ltd., Further Considerations on Scenario3; Athens, Greece; R1-112586, Aug. 22-26, 2011.
Samsung, Full Buffer Evaluation Results for CoMP Scenarios 3 and 4, Athens, Greece; R1-112709, Aug. 22-26, 2011.
Panasonic, Flexible CoMP Operation based on Dedicated CSI-RS Configuration, 3GPP TSG RAN WG1 #66, 3GPP, Athens, Greece, R1-112362, Aug. 22-26, 2011.
NTT Docomo, R1-111637, System Performance of JP-CoMP in Homogeneous Networks with RRHs, 3GPP TSG RAN WG1 #65, 3GPP, Barcelona, Spain, May 9-13, 2011.
Samsung, R1-093383, CoMP Implicit CQI Feedback Discussions, 3GPP TSG RAN WG1 #58, 3GPP, Shenzhen, China, Aug. 24-28, 2009.
Korean Office Action dated Dec. 3, 2018, issued in Korean Patent Application No. 10-2018-0111089.
Korean Notice of Allowance dated Apr. 25, 2019, issued in Korean Patent Application No. 10-2018-0111089.

* cited by examiner

PDSCH

DM-RS for ports 7, 8, 11, 13

DM-RS for ports 9, 10, 12, 14

CRS

Control Channel

☐ PDSCH

▥ DM-RS for ports 7, 8, 11, 13

▤ DM-RS for ports 9, 10, 12, 14

▩ CRS

▦ Control Channel

METHOD AND APPARATUS FOR TRANSMITTING AND RECEIVING FEEDBACK FOR COOPERATIVE COMMUNICATION SYSTEM

PRIORITY

This application is a continuation application of a prior application Ser. No. 15/924,996, filed on Mar. 19, 2018, which is a continuation application of a prior application Ser. No. 15/234,574, filed on Aug. 11, 2016, which issued as U.S. Pat. No. 9,924,528 on Mar. 20, 2018, which is a continuation of prior application Ser. No. 14/587,510, filed on Dec. 31, 2014, which has issued as U.S. Pat. No. 9,420,596 on Aug. 16, 2016, which is a continuation application of a prior application Ser. No. 13/625,113, filed on Sep. 24, 2012, which issued as U.S. Pat. No. 8,942,125 on Jan. 27, 2015, and which claimed the benefit under 35 U.S.C. § 119(a) of a Korean patent application filed on Sep. 23, 2011 in the Korean Intellectual Property Office and assigned Serial No. 10-2011-0096603, the entire disclosure of which is hereby incorporated by reference.

BACKGROUND OF THE INVENTION

1. Field of the Invention

The present invention relates to a method and an apparatus for transmitting and receiving a feedback signal in a cellular mobile communication system having a plurality of base stations. More particularly, the present invention relates to a method of efficiently transmitting and receiving feedback in a Cooperative Multi-Point (CoMP) system supporting downlink transmission of a User Equipment (UE) by cooperation with the base stations, and an apparatus thereof.

2. Description of the Related Art

A mobile communication system according to the related art provides a voice-oriented service. However, the mobile communication system has evolved to support high speed and high quality wireless packet data communication capabilities and provides a voice service, a data service, and a multi-media service. Various mobile communication standards such as High Speed Downlink Packet Access (HSDPA), High Speed Uplink Packet Access (HSUPA), Long Term Evolution (LTE), Long Term Evolution Advanced (LTE-A) of the $3^{rd}$ Generation Partnership Project (3GPP), High Rate Packet Data (HRPD) of 3GPP2, and 802.16 of the Institute of Electrical and Electronics Engineers (IEEE) have been developed. The mobile communication standards are for supporting a high speed and high quality wireless packet data transmission service.

An LTE system is a system developed to efficiently support high speed wireless packet data transmission. The LTE system may maximize capacity of a wireless system using various wireless access technologies.

The LTE-A system is an evolved wireless system of an LTE system and has improved data transmission performance as compared with the LTE system.

A $3^{rd}$ Generation (3G) wireless packet data communication system, such as HSDPA, HSUPA, and HRPD, uses an Adaptive Modulation and Coding (AMC) scheme and a channel reply scheduling scheme to improve transmission efficiency. According to the AMC scheme and the channel reply scheduling scheme, a transmitter may receive feedback of partial channel state information and apply a suitable modulation and coding scheme at the most efficiently determined time point.

In a wireless packet data communication system to which the AMC scheme is applied, a transmitter may control an amount of transmitted data according to a channel state. That is, if the channel state is not satisfactory, the transmitter may reduce the amount of the transmitted data to reduce a reception error probability to a desired level. If the channel state is excellent, the transmitter may increase the amount of the transmitted data to efficiently transmit a large amount of information while maintaining a reception error probability to a desired level.

In a wireless packet data communication system to which a channel reply scheduling resource management method is applied, a transmitter selectively provides a service to a user having an excellent channel state among a plurality of users. Accordingly, available system capacity in the channel reply scheduling scheme is increased as compared with a scheme of allocating a channel to one user to serve. Such capacity increase refers to a multi-user diversity gain.

When the AMC scheme is used together with a Multiple Input Multiple Output (MIMO) transmission scheme, it may include a function of determining the number of spatial layers of a transmitted signal or a rank. In this case, the wireless packet data communication system to which the AMC scheme is applied simply considers a code rate and a modulation scheme to determine an optimal data transmission rate and whether to transmit how many layers using the MIMO.

It is known in the art that an increase in capacity is expected in an Orthogonal Frequency Division Multiple Access (OFDMA) scheme as compared with a Code Division Multiple Access (CDMA) scheme. One of various reasons for the increase in capacity in the OFDMA scheme is that a frequency domain scheduling may be performed in a frequency axis. As a capacity gain is acquired through the channel replay scheduling scheme due to a channel change characteristic according to a time, if using a characteristic which a channel is changed according to a frequency, additional capacity gain can be obtained. In recent years, research has been performed on an evolution from the CDMA scheme being a multiple access scheme used in $2^{nd}$ Generation (2G) and 3G mobile communication systems to an OFDMA scheme being a next generation system. 3GPP and 3GPP2 have worked on standardizing an evolved system using OFDMA.

FIG. 1 is a diagram illustrating a cellular mobile communication system according to the related art.

Referring to FIG. 1, transceiving antennas 130, 140, and 150 are arranged in centers of cells 100, 110, and 120, respectively. In a cellular mobile communication system having a plurality of cells, a certain User Equipment (UE) receives a mobile communication service from one cell selected for a long semi-static period. Here, the mobile communication service is a service using the above various schemes. For example, it is assumed that the cellular mobile communication system is configured by three cells 100, 110, and 120. It is assumed that the first cell 100, the second cell 110, and the third cell 120 provide a mobile communication service to first UEs 101 and 102, a second UE 111, and a third UE 121, respectively.

A distance between the first UE 102 and the antenna 130 is greater than a distance between the first UE 101 and the antenna 130. A signal from a center antenna 150 of another cell 120 interferes with the reception of a signal from the antenna 130 by the first UE 102. Accordingly, data transmission speed between the first UE 102 and the cell 100 becomes relatively low.

When the cells 100, 110, and 120 independently provide a mobile communication service, a Reference Signal (RS) for estimating a channel is transmitted to measure a downlink channel state of each cell. In a case of a 3GPP LTE-A system, a UE measures a channel state between the UE and a base station using a Channel Status Information RS (CSI-RS) which the base station transmits.

FIG. 2 is a diagram illustrating a location of a CSI-RS which a base station transmits to a UE in an LTE-A system according to the related art.

Referring to FIG. 2, a signal with respect to two CSI-RS antenna ports in each location of reference numerals 200 to 219 may be transmitted. That is, the base station transmits two CSI-RSs for measuring the downlink to the UE from a location 200. As shown in FIG. 1, in a case of a cellular mobile communication system having a plurality of cells, locations to which CSI-RS is transmitted may be allocated differently according to cells. For example, in a case of a cell 100 shown in FIG. 1, a CSI-RS may be transmitted from the location 200 in a case of the cell 100 shown in FIG. 1, from the location 205 in a case of the cell 110, and from the location 210 in a case of the cell 120. As described above, a resource for CSI-RS transmission is allocated in different locations with respect to respective cells to prevent CSI-RSs of different cells from causing mutual interference.

A CSI-RS sequence transmitted from locations of CSI-RS antenna ports is defined below in Equation 1 and Equation 2.

$$r_{l,n_s}(m) = \frac{1}{\sqrt{2}}(1 - 2 \cdot c(2m)) + j\frac{1}{\sqrt{2}}(1 - 2 \cdot c(2m + 1)), \quad \text{Equation 1}$$
$$m = 0, 1, \ldots, N_{RB}^{max,DL} - 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad \text{Equation 2}$$

In Equation 1 and Equation 2, l denotes an OFDM symbol order in one slot, and $N_{CP}$ is determined with 0 or 1 according to a length of a Cyclic Prefix (CP) used in a cell.

In the cellular mobile communication system shown in FIG. 1, a UE existing at an edge of a cell interferes with other cells and thereby may cause those other cells to not be able to communicate using a high data transmission rate. That is, in the cellular mobile communication system shown in FIG. 1, a data transmission rate to be provided to UEs existing in a cell is greatly affected according to where is the UE is located in the cell. Accordingly, in the cellular mobile communication system, a UE located relatively close to a cell center may transmit and receive data with a high transmission rate. A UE located in a remote location may not transmit and receive data with a high transmission rate.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method of constructing a Cooperative Multi-Point (CoMP) scheme based on an Long Term Evolution Advanced (LTE-A) system and transmitting and receiving feedback for efficiently operating the constructed cooperative transmission, and an apparatus thereof.

In accordance with an aspect of the present invention, a method of transmitting feedback in a CoMP system is provided. The method includes receiving feedback set information including allocation information of a Channel Status Information Reference Signal (CSI-RS) transmitted for estimating a channel of a User Equipment (UE), receiving IDentification (ID) information for identifying a CoMP set including CSI-RS allocation information from a cell operating in a CoMP mode, extracting the CoMP set using the ID information and a feedback set, detecting a first feedback mode and first feedback timing with a first CSI-RS not included in the CoMP set among CSI-RSs included in the feedback set, and generating and transmitting feedback with respect to the detected first CSI-RS according to the first feedback mode and the first feedback timing.

In accordance with another aspect of the present invention, a UE for transmitting feedback in a CoMP system is provided. The equipment includes a communication unit receiving feedback information including allocation information of a CSI-RS transmitted for estimating a channel of the UE, and receiving identification information for identifying a CoMP set including the CSI-RS allocation information from a cell operating in a CoMP mode, and a controller extracting the CoMP set using the ID information and a feedback set, a first feedback mode and first feedback timing with respect to the first CSI-RS not included in the CoMP set among the CSI-RSs included in the feedback set, and generating feedback with respect to the detected first CSI-RS according to the first feedback mode and the first feedback timing, wherein the communication unit transmits feedback with the first generated CSI-RS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
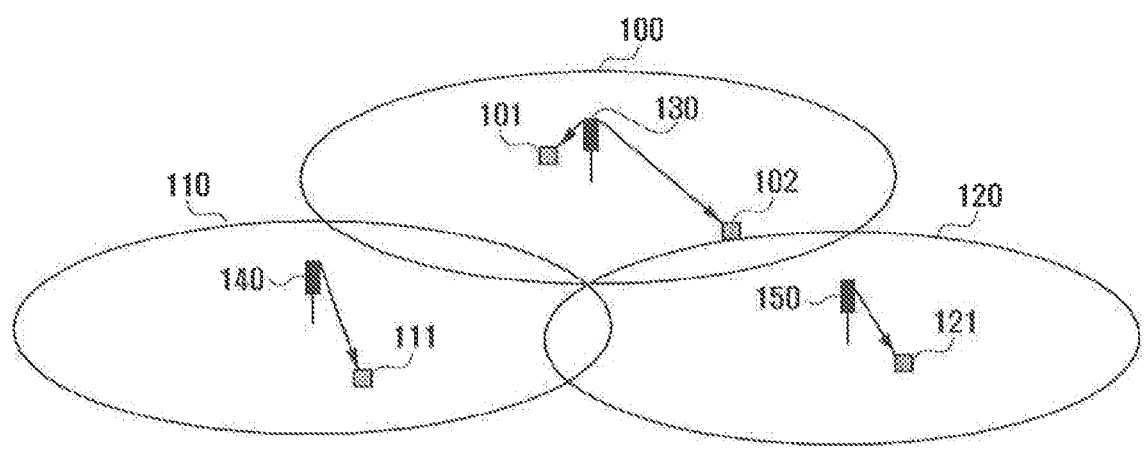
FIG. 1 is a diagram illustrating a cellular mobile communication system according to the related art.
Figure 2:
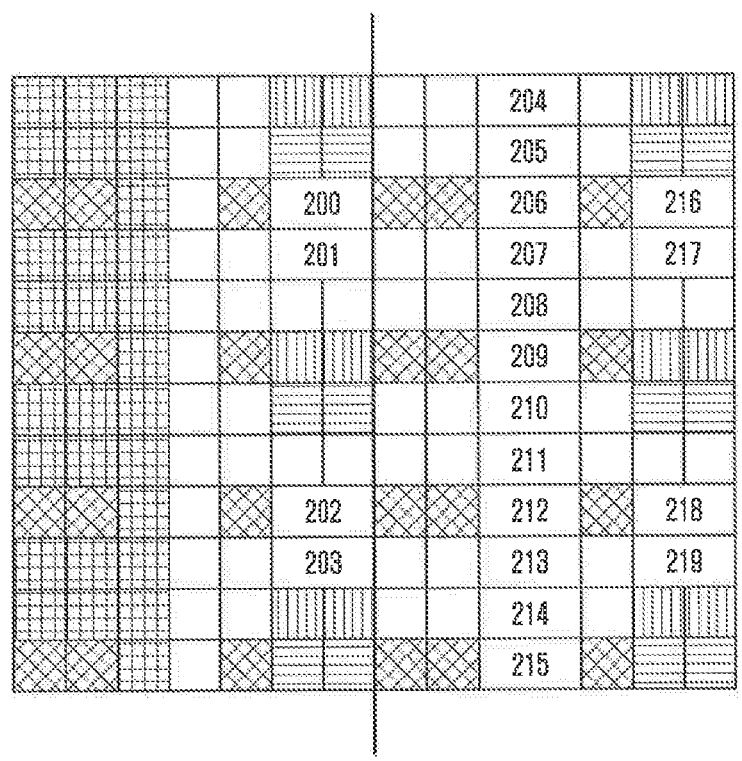
FIG. 2 is a diagram illustrating a location of a Channel Status Information Reference Signal (CSI-RS) which a base station transmits to a User Equipment (UE) in a Long Term Evolution Advanced (LTE-A) system according to the related art.
Figure 2:
Figure 2:
Figure 2:
Figure 2:
Figure 2:

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, detailed description of exemplary embodiments of the present invention is made in the context of a wireless communication system based on Orthogonal Frequency Division Multiple Access (OFDM), more particularly, a $3^{rd}$ Generation Partnership Project (3GPP) Evolved Universal Terrestrial Radio Access (EUTRA) standard. However, the concepts discussed herein are applicable to other communication systems having similar technical background and channel forms by applying variations and modifications falling within the spirit and scope of the present invention, and it will become apparent to those skilled in the art.

A cellular mobile communication system includes a plurality of cells constructed in a limited zone. Base station equipment performing mobile communication in each cell provides a mobile communication service to User Equipment (UEs) in the cell. In this case, a certain UE is known as a system for receiving support of a mobile communication service from only one semi-static determined cell. Hereinafter, such a system is referred to as a non-Cooperative Multi-Point (CoMP) system.

A data transmission rate provided to all UEs existing in a cell may be changed according to a relative location of a UE in a cell in a non-CoMP system. That is, a UE located in the center of a cell may receive a high data transmission rate, but a UE located relatively close to a cell edge may not receive the high data transmission rate.

A CoMP system is known as a contrast system in the art. To support a UE located in an outer peripheral portion of a cell in the CoMP system, a plurality of cells cooperate with each other to transmit data. In this case, in comparison with the non-CoMP system, an improved mobile communication service may be provided. The present exemplary embodiments suggest a feedback method and an apparatus thereof in consideration of a Dynamic cell Selection (DS) scheme and a Joint Transmission (JT) scheme among CoMP systems. In this case, the DS scheme refers to a scheme in which a UE measures a channel state by cells to select a cell having an optimal channel. The JT scheme refers to a scheme which a plurality of cells simultaneously transmit data to a certain UE. According to the present exemplary embodiments, for example, the foregoing problems may be addressed by improving a feedback structure so that a DS scheme or a JT scheme is efficiently applied to a Long Term Evolution (LTE)-system.

Figure 3:
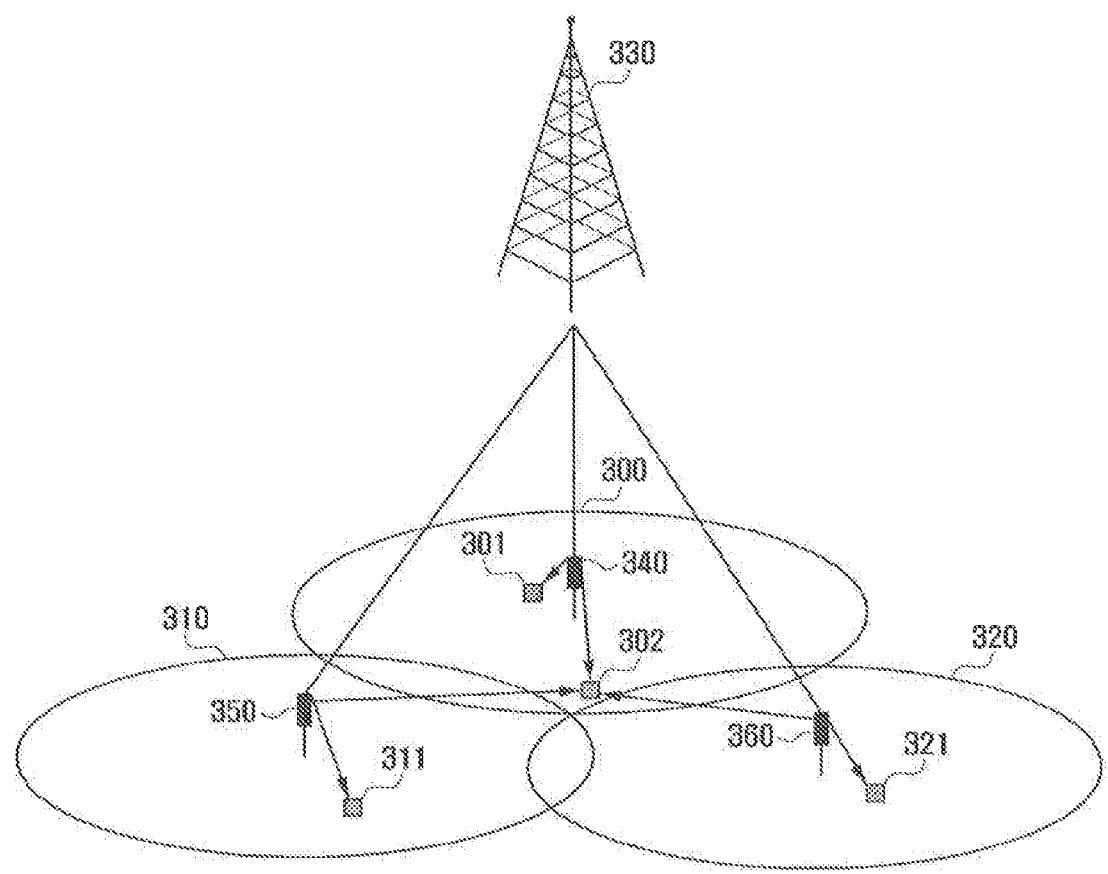
FIG. 3 is a diagram illustrating a configuration of a cellular mobile communication system according to an exemplary embodiment of the present invention.

FIG. 3 is a diagram illustrating a configuration of a cellular mobile communication system according to an exemplary embodiment of the present invention.

Referring to FIG. 3, a cellular mobile communication system is configured to include three cells 300, 310, and 320. As used herein, the term "cell" refers to a data transmission region in which certain transmission points 340, 350, and 360 may serve. Respective transmission points 340, 350, and 360 may be a Remote Radio Head (RRH) having a cell IDentifier (ID) with a macro base station in a macro region in common and a macro or pico cell which respective transmission points have different cell IDs.

The central control unit 330 is a device capable of transmitting and receiving data to and from UEs 301, 302, 311, 321, and processing the transmitted and received data. A macro base station may refer to a central control unit when respective transmission points 340, 350, and 360 is an RRH having a cell identification with a macro base station in common. A device for integrally managing respective cells may be referred to a central control unit when respective transmission points 340, 350, and 360 are a macro or pico cell having different cell IDs.

Referring to FIG. 3, the cellular mobile communication system includes cells 300, 310, and 320, UEs 301, 311, and 321 receiving data from the closest cell, and a UE 302 receiving CoMP transmission from a plurality of cells 300, 310, and 320. The UEs 301, 311, and 321 having received data from the closest cell estimate a channel through a Channel Status Information Reference Signal (CSI-RS) with respect to a cell in which the UEs are located and transmit related feedback to the central control unit 330. However, the UE 302 having received CoMP transmission from a plurality of cells 300, 310, and 320 estimates channels from the three cells 300, 310, and 320. Estimation of a channel for receiving control information and system information must be separately performed. Accordingly, to estimate a channel performed by the UE 302, the central control unit 330 allocates three CSI-RS resources corresponding to respective cells 300, 310, and 320, and a CSI-RS resource for control information and system information to the UE 302. A method of allocating a CSI-RS to the UE 302 by the central control unit 330 will be described below with reference to FIG. 4.

Figure 4:
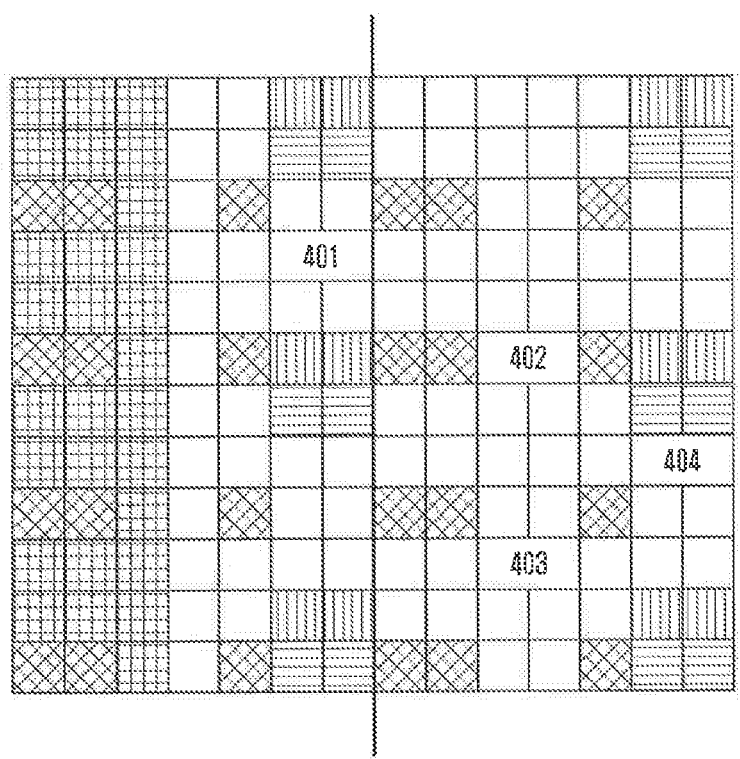
FIG. 4 is a diagram illustrating a location of a CSI-RS which a base station transmits to a UE according to an exemplary embodiment of the present invention.

FIG. 4 is a diagram illustrating a location of a CSI-RS which a base station transmits to a UE according to an exemplary embodiment of the present invention.

Referring to FIG. 4, the central control unit 330 allocates four CSI-RSs to resources 401, 402, 403, and 404, respectively, and transmits the CSI-RS using a corresponding resource. The UE 302 having received CoMP transmission may estimate channels of three cells 300, 310, and 320 using CSI-RSs received through the resources 401, 402, 403, and 404 and estimate a channel for control information and system information. A CSI-RS for estimating a channel of the cell 300 is allocated to the resource 401. A CSI-RS for estimating a channel of the cell 310 is allocated to the resource 402. A CSI-RS for estimating a channel of the cell 320 is allocated to the resource 403. A CSI-RS for estimating a channel for control information and system information is allocated to the resource 404. A set having a resource to which at least one CSI-RS transmitted for channel estimation of a CoMP UE refers to a feedback set. The forgoing exemplary embodiment has illustrated a method of allocating a CSI-RS when the central control unit 330 knows all cell IDs of cells performing CoMP transmission. However, the present invention is not limited thereto. For example, the cells having performed the CoMP transmission share and transmit each cell ID and location information of a resource to which CSI-RS is allocated to a UE.

Figure 5:
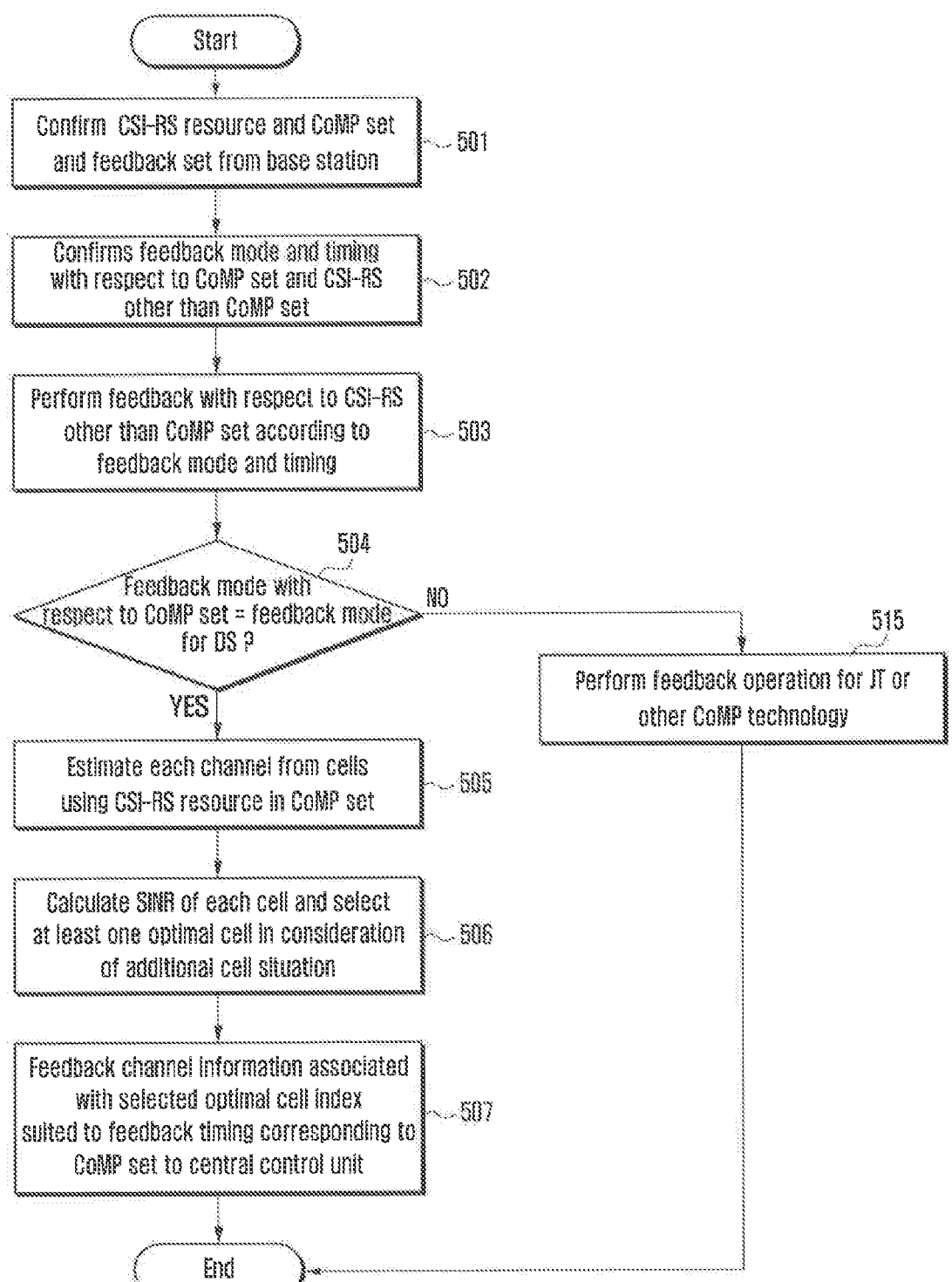
FIG. 5 is a flowchart illustrating a feedback procedure of a UE in a cellular mobile communication system using a Dynamic cell Selection (DS) scheme according to an exemplary embodiment of the present invention.

FIG. 5 is a flowchart illustrating a feedback procedure of a UE in a cellular mobile communication system using a DS scheme according to an exemplary embodiment of the present invention. Here, the DS scheme refers to a scheme which measures a channel state of each cell to select a cell of an optimized channel by the UE, namely, a dynamic cell selection scheme.

Referring to FIG. 5, a UE confirms a CSI-RS resource and CoMP set and a feedback set received from a base station at step 501. The CoMP set is a set of a CSI-RS allocated among CSI-RS resources allocated to the UE to receive a cell operating in a CoMP mode such as DS or JT. CoMP set information is information indicating which CSI-RS is included in the CoMP set. For example, the CoMP set information may be a set of IDs of CSI-RS resource allocated to receive a cell operating in a CoMP mode. The UE transmits feedback for a specific CoMP technology with respect to a CSI-RS resource in a CoMP set. The base station may report CoMP set information to the UE through a set including respective CSI-RS resource indexes. The base station may use a bitmap sequence with respect to a CSI-RS resource to report the CoMP set information. The feedback set is a set including all resources to which a transmitted CSI-RS is transmitted for estimating a channel of a CoMP UE. The feedback set information is information indicating which CSI-RS is included in the feedback set.

For example, it is assumed that the feedback set is {1, 2, 3} and the CoMP set is {1, 2}. In this case, the base station may report an ID itself of a CSI-RS included in the CoMP set to the UE separately from a feedback set, and report the CoMP set by transferring a sequence of [1, 1, 0] together with the feedback set. For example, it may be engaged that only a feedback set part corresponding to a part corresponding to 1 from the sequence is included in the CoMP set. The base station may report information capable of identifying a CSI-RS not included in a CoMP set among CSI-RSs included in the feedback set to the UE. In this case, the UE may recognize a remainder achieved by subtracting a CSI-RS reported which is not included in the CoMP set from the feedback set. A reason to separately set the feedback set and the CoMP set is because a CSI-RS resource for control information and system information such as a resource 404 of FIG. 4 uses separate feedback not requiring to be operated in JT or DS.

Feedback with respect to a CSI-RS resource not included in the CoMP set may have respective feedback modes by resources, and a common feedback mode. That is, feedback with respect to the CoMP set and feedback with respect to resources other than the CoP set operate in different modes. An example of the CoP set will be described below. Feedback with respect to the Number 3 CSI-RS resource other than a CoMP set in the feedback set {1, 2, 3} may include wideband Channel Quality Indicator (CQI)/Precoding Matrix Indicator (PMI), Rank Indication (RI) or may additionally include a subband CQI. Feedback with respect to the CoMP set {1, 2} may include an index of a cell which a UE prefers and wideband CQI/PMI, RI corresponding to the cell or additionally include a subband CQI. Here, there may be one or a plurality of preference cell indexes.

To transmit each feedback information to a base station, when using periodic feedback through a Physical Uplink Control Channel (PUCCH), periods of information with respect to a CoMP set and a period of information with respect to a CSI-RS resource other than a CoMP set may be separately allocated. When transmitting timings of respective information collide with each other, feedback is performed according a preset priority. For example, feedback with respect to a resource other than a CoMP set used for receiving a control channel has the highest priority and a cell index preferring respect to a CoMP set may have the second highest priority. Next, RI, wideband CQI/PMI, subband CQI with respect to a CoMP set may have higher priorities in an order of the RI, the wideband CQI/PMI, and the subband CQI. This is a method of having preference to information influencing UE scheduling. If an optional cell index cannot be sent due to a collision of transmission timing, information such as CQI/PMI, RI with respect to the timing may engage to feedback information with respect to a preset cell index. For instance, the preset cell index may be a minimum index among a CoMP set. The base station informs the UE of the CoMP set together with the preset cell index. An optimal cell index transmitted in previous timing may be as the preset cell index.

To transmit each feedback information to a base station, when using non-periodic channel information feedback through a Physical Uplink Shared CHannel (PUSCH), all information with respect to CSI-RS resources in the feedback set may be fed back at a time, or information with the CoMP set and information other than the CoMP set may be fed back at a time in consideration of the CoMP set. An example of the CoMP set is described. When non-periodic channel information feedback through PDCCH information is activated, the UE may feedback all of the RI, the CQI, and the RMI with respect to three CSI-RSs in the feedback set {1, 2, 3} at a time. As another method, the UE may feedback an optimal cell index with respect to the CoMP set and associated RI, CQI, PMI together RI, CQI, and PMI with respect to a cell 3 other than the CoMP set at a time in consideration of the CoMP set {1, 2}. The reason to use such a method is because more bits in a case of non-periodic channel information feedback may be fed back at a time as compared with a case of periodic feedback. As still another method, a central processing unit simultaneously transmits a specific index in the feedback set while activating non-periodic channel information feedback through a PDCCH to feedback RI, CQI, and PMI with respect to a CSI-RS corresponding thereto to the UE. In this case, a bit confirming which feedback of CSI-RS resource is transmitted to added to downlink control channel information. According to the scheme, the system may use a feedback resource in a dynamic scheme.

The UE confirms a feedback mode and a feedback period (timing) with respect to a CoMP set and a CSI-RS other than the CoMP set at step 502. For example, the feedback mode and the feedback timing may be transmitted through upper signaling. The UE performs feedback with respect to a CSI-RS other than a CoMP set according to the feedback mode and the feedback timing at step 503. The UE determines whether a feedback mode with respect to the CoMP set is a feedback mode for DS at step 504. That is, the UE determines whether the feedback mode with respect to the CoMP set is a feedback mode requesting transmission of preference cell information. In the feedback mode for DS, during feedback transmission, transmission of the preference cell information is required. When the feedback mode with respect to the CoMP set is not the feedback mode of DS, the process goes to step 515. The UE performs a feedback operation for JT or other CoMP technology at step 515. When the feedback mode with respect to the CoMP set is the feedback mode for DS, the process goes to step 505. The UE estimates each channel from a plurality of cells using a CSI-RS resource in the CoMP set at step 505. After that, the UE calculates a Signal-to-Interference-plus-Noise-Ratio (SINR) of each cell or other channel quality index and selects at least one optimal cell in consideration of an additional cell situation at step 506. If the optimal cell is selected at step 506, the UE feedbacks channel information associated with the selected optimal cell index suited to feedback timing corresponding to the CoMP set to the central control unit 330 at step 507. As described above, according to a modified exemplary embodiment, the feedback timing with respect to channel information associated with the optimal cell index may differ from feedback corresponding to the CoMP set. Such feedback timing may differ from feedback timing with respect to a CSI-RS resource other than the CoMP set.

Figure 6:
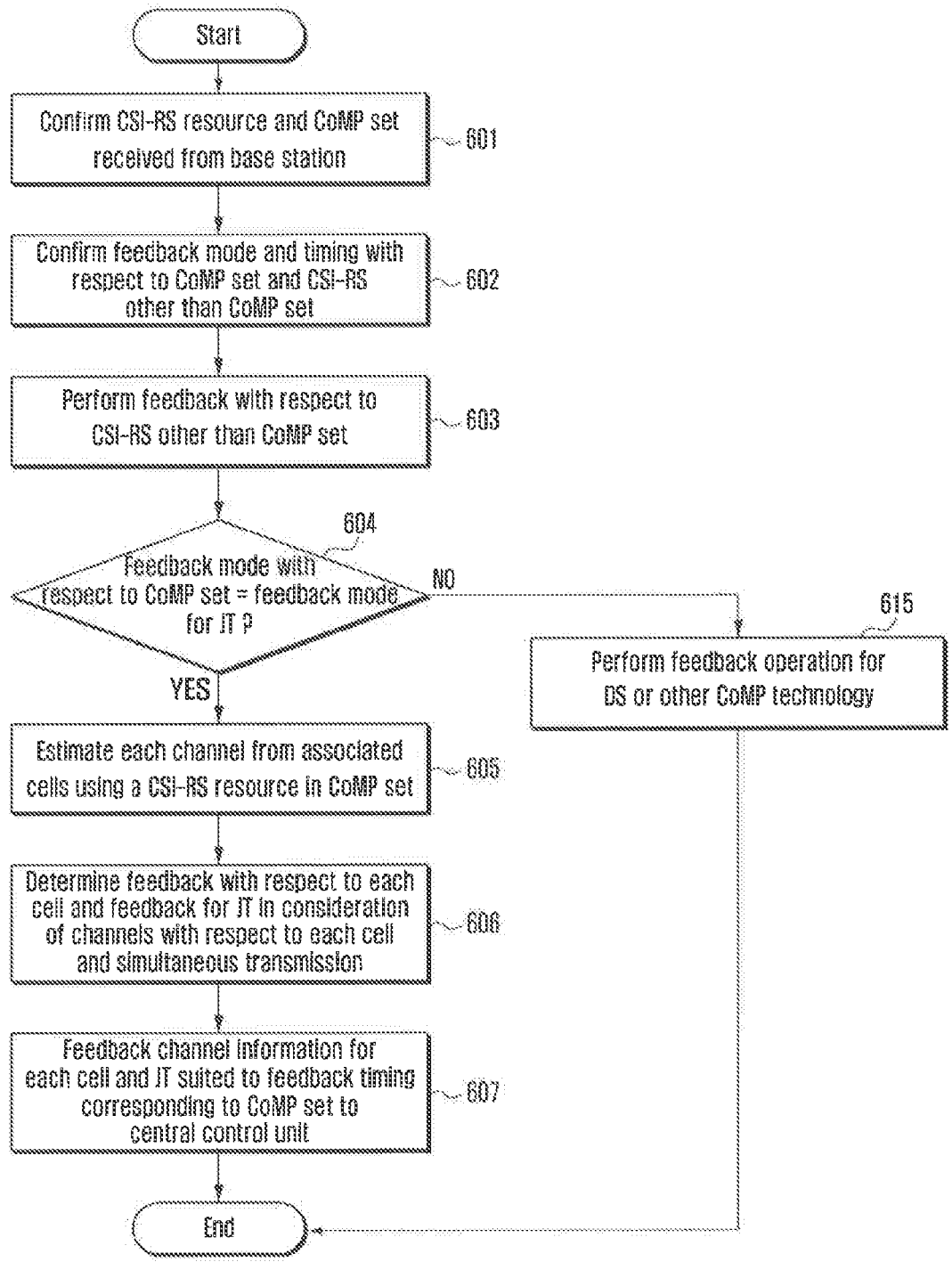
FIG. 6 is a flowchart illustrating a feedback procedure of a UE in a cellular mobile communication system using a Joint Transmission (JT) scheme according to an exemplary embodiment of the present invention.

FIG. 6 is a flowchart illustrating a feedback procedure of a UE in a cellular mobile communication system using a JT scheme according to an exemplary embodiment of the present invention. Here, the JT scheme refers to a scheme of simultaneously transmitting data through a plurality of cells.

Referring to FIG. 6, a UE confirms a CSI-RS resource and CoMP set received from a base station at step 601. A method of informing the UE of the CoMP set by the base station is the same as the DS method of FIG. 5. Feedback with respect to a CSI-RS resource not included in the CoMP set may have feedback modes by resources and have a common feedback mode. That is, the feedback with the CoMP set and feedback with resources other than the CoMP set operated in different modes. An example of the CoMP set is described. Feedback with respect to the Number 3 CSI-RS resource other than a CoMP set in the feedback set {1, 2, 3} may include wideband CQI/PMI, RI or additionally include a subband CQI. Feedback with respect to the CoMP set may include CQI, PMI, and RI information in consideration of cooperative transmission between cells in addition to CQI, PMI, and RI corresponding to each cell. Here, the UE does not separately feedback CQI and RI with respect to cooperative transmission but may feedback only phase difference information so that the base station combines PMIs of respective cells to use during cooperative transmission.

To transmit each feedback information to a base station, periodic feedback through a PUCCH may be used. In this case, periods of information with respect to the CoMP set and periods of information with respect to a CSI-RS resource other than the CoMP set may be independently allocated. When transmitting timings of respective information that collide with each other, feedback is performed according a preset priority. For example, feedback with respect to a resource other than a CoMP set used for receiving a control channel has the highest priority and an RI with respect to each resource in the CoMP set, wideband CQI/PMI, a subband CQI may have the second highest priority. Feedback for cooperative transmission may have the lowest priority. This is a method of having preference to information influencing UE scheduling.

Phase information connecting a PMI of each cell may be used as feedback for cooperative transmission. In this case, when a PMI of a specific cell is not sent due to collision of transmission timing, it may be engaged that phase information with respect to the latest PMI with respect to the specific cell is fedback. It may be engaged that phase information with respect to a default PMI is fedback. To transmit each feedback information to a base station, when using non-periodic channel information feedback through a PUSCH, the UE may feedback all information with respect to a CSI-RS resource in the feedback set at a time. The UE may feedback information with respect to the CoMP set and information other than the CoMP set at a time in consideration of the CoMP set.

When non-periodic channel information feedback through a PDCCH is activated, the UE may feedback all of RI, CQI, PMI with respect to three CSI-RSs in a feedback set {1, 2, 3}. As another scheme, the UE may feedback RI, CQI, PMI with respect to each CSI-RS resource and RI, CQI, PMI with respect to cooperative transmission in the CoMP set together with RI, CQI, PMI with respect to a cell 3 except for the CoMP set in consideration of the CoMP set {1, 2}. The reason to use such a scheme is because more bits in a case of non-periodic channel information feedback may be fedback at a time as compared with a case of periodic feedback. As another scheme, a central processing unit may transmit a specific index in a feedback set while activating non-periodic channel information feedback through a PDCCH to feedback RI, CQI, and PMI with respect to a corresponding CSI-RS. In this case, a bit confirming whether to transmit feedback with respect to any CSI-RS resource must be added to the PDSCH activating non-periodic channel information feedback. According to the scheme, the system may use a feedback resource in a dynamic method.

The UE confirms a feedback mode and a feedback period (timing) with respect to a CoMP set and a CSI-RS other than the CoMP set at step 602. The feedback mode and the feedback timing may be transformed, for example, through upper signaling. The UE performs feedback with respect to the CSI-RS other than the CoMP set at step 603. The UE determines whether a feedback mode with respect to the CoMP set is a feedback mode for JT at step 604. That is, the UE determines whether a feedback mode with respect to the CoMP set is a feedback mode requiring transmission of information for cooperative transmission. In the feedback mode for JT, information for cooperative transmission must be transmitted during feedback. If the feedback mode with respect to the CoMP set is not the feedback mode for JT, the process goes to step 615. The UE performs a feedback operation for DS or other CoMP technology at step 615. If the feedback mode with respect to the CoMP set is the feedback mode for JT at step 604, the process goes to step 605. The UE estimates each channel from a plurality of associated cells using a CSI-RS resource in the CoMP set at step 605.

After that, the UE determines feedback with respect to each cell and feedback for JT in consideration of a channel with respect to each cell and a channel with respect to simultaneous transmission at step 606. Here, the feedback for JT may be CQI, RI, and PMI for cooperative transmission or phase information for connection of a PMI with respect to each channel as described above. If the feedback is determined at step 606, the UE, the UE feedbacks channel information for each cell and JT suited to feedback timing corresponding to the CoMP set to the central control unit 330 at step 607. As described above, feedback timing corresponding to the CoMP set may differ from feedback timing with respect to channel information associated with an optimal cell index.

Figure 7:
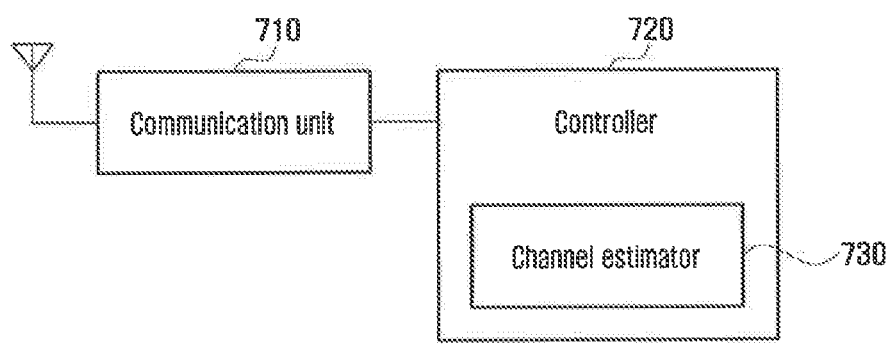
FIG. 7 is a block diagram illustrating a UE according to an exemplary embodiment of the present invention.

FIG. 7 is a block diagram illustrating a UE according to an exemplary embodiment of the present invention.

Referring to FIG. 7, a UE includes a communication unit 710 and a controller 720.

The communication unit 710 performs a function of transmitting or receiving data. Here, the communication unit 710 may transmit channel information for a CoMP technology to the central control unit 330 under the control of the controller 720.

The controller 720 control states and operations of one or more constituent elements of the UE. Here, the controller 720 may select feedback information for an optimal cell or cooperative communication, and feedback channel information with respect to the selected cell to the central control unit.

The controller 720 includes a channel estimator 730. The channel estimator 730 determines information associated with the CoMP set received from the central control unit and feedback information used with respect to each CSI-RS through a feedback mode, and estimates a channel using a CSI-RS received according thereto. The channel estimator 730 may control the communication unit 710 to feedback channel information associated with the CoMP to the central control unit.

Here, the foregoing exemplary embodiment has illustrated that the UE includes the communication unit 710 and the controller 720. However, the present invention is not limited thereto. For example, the UE may further include various constituent elements according to a performed function in the UE. For example, the UE may include a display unit displaying a current state of the UE, an input unit to which a signal such as execution of a function from the user is input, and a memory storing data generated by the UE.

Figure 8:
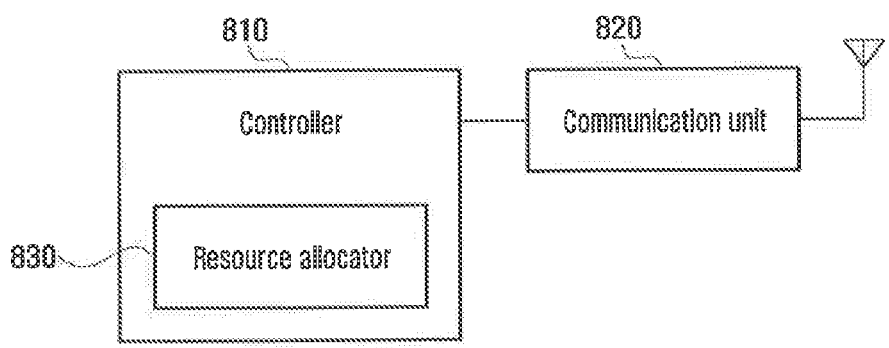
FIG. 8 is a block diagram illustrating a central control unit according to an exemplary embodiment of the present invention.

FIG. 8 is a block diagram illustrating a central control unit according to an exemplary embodiment of the present invention.

Referring to FIG. 8, a central control unit includes a controller 810 and a communication unit 820.

The controller 810 controls states and operations of one or more constituent elements of the central control unit. Here, the controller 810 allocates a CSI-RS of each cell for estimating a channel of the UE to resources and allocates a CoMP set and informs the UE of associated information if necessary.

The controller 810 includes a resource allocator 830. The resource allocator 830 allocates a CSI-RS to respective resources such that the UE may estimate a channel of each cell, and transmits a CSI-RS using a corresponding resource. Resources allocated to the respective cells are allocated corresponding to a CSI-RS for estimating a channel of each cell. A set including a resource to which at least CSI-RS transmitted for channel estimation of a CoMP UE is allocated refers to a feedback set.

The communication unit 820 performs a function of transmitting and receiving a cell and data which the UE or the communication unit 820 manages. Here, the communication unit 820 transmits a CSI-RS to the UE through an allocated resource and receives feedback with respect to channel information from the UE under control of the controller 810.

According to an exemplary embodiment of the present invention, neighboring cells for a UE located in an outer peripheral portion of a cell in a cellular mobile communication system may cooperate with each other to transmit data through CoMP between cells. Cells in the cellular mobile communication system may employ an improved mobile communication service as compared with a case where cells do not cooperate. If the UE is located in an outer peripheral portion of a cell, the UE may dynamically determine a cell to which the UE will transmit. In addition, a plurality of cells may simultaneously provide information to a UE located in an outer peripheral portion of the cell to increase an information receiving rate of the UE. Through this, all UEs in a cellular mobile communication system may acquire a uniformly high data transmission rate regardless of a relative location in the cell.

While the invention has been shown and with reference to certain exemplary embodiments thereof, it will be understood by those skilled in the art that various changes in form and details may be made therein without departing from the spirit and scope of the present invention as defined in the appended claims and their equivalents.

What is claimed is:

1. A method performed by a terminal in a communication system, the method comprising:
   receiving a configuration message including information on resources for a plurality of channel status information-reference signals (CSI-RSs);
   receiving at least one CSI-RS based on the information;
   determining whether a transmission of information for identifying a CSI-RS resource among the resources for the plurality of CSI-RSs is required;
   in case that the transmission of the information for identifying the CSI-RS resource is required, determining the CSI-RS resource among the resources for the plurality of CSI-RSs based on a measurement result of the received at least one CSI-RS; and
   transmitting a feedback message comprising the information for identifying the determined CSI-RS resource.

2. The method of claim 1, wherein the feedback message further comprises a rank indication (RI), a precoding matrix indicator (PMI), and a channel quality indicator (CQI) associated with the determined CSI-RS resource.

3. The method of claim 1, further comprising, in case that the transmission of the information for identifying the CSI-RS resource is not required, transmitting the feedback message including a rank indication (RI), a precoding matrix indicator (PMI), and a channel quality indicator (CQI).

4. The method of claim 1, wherein the determining of the CSI-RS resource comprises:
   measuring a signal to noise interference ratio (SINR) of the received at least one CSI-RS; and
   determining the CSI-RS based on the measured SINR of the received at least one CSI-RS.

5. A method performed by a base station in a communication system, the method comprising:
   transmitting a configuration message including information on resources for a plurality of channel status information-reference signals (CSI-RSs);
   transmitting at least one CSI-RS based on the information; and
   in case that a reception of information for identifying a CSI-RS resource among the resources for the plurality of CSI-RSs is required, receiving a feedback message including the information for identifying the CSI-RS resource, the CSI-RS resource is determined based on a measurement result of the at least one CSI-RS.

6. The method of claim 5, wherein the feedback message further comprises a rank indication (RI), a precoding matrix indicator (PMI), and a channel quality indicator (CQI) associated with the determined CSI-RS resource.

7. The method of claim 5, further comprising, in case that the reception of the information for identifying the CSI-RS resource is not required, receiving the feedback message including a rank indication (RI), a precoding matrix indicator (PMI), and a channel quality indicator (CQI).

8. The method of claim 5, wherein the CSI-RS resource is determined based on a signal to noise interference ratio (SINR) measurement of the at least one CSI-RS.

9. A terminal in a communication system, the terminal comprising:
a transceiver; and
a controller configured to:
receive, via the transceiver, a configuration message including information on resources for a plurality of channel status information-reference signals (CSI-RSs),
receive, via the transceiver, at least one CSI-RS based on the information,
determine whether a transmission of information for identifying a CSI-RS resource among the resources for the plurality of CSI-RSs is required,
in case that the transmission of the information for identifying the CSI-RS resource is required, determine the CSI-RS resource among the resources for the plurality of CSI-RSs based on a measurement result of the received at least one CSI-RS, and
transmit a feedback message including the information for identifying the determined CSI-RS resource.

10. The terminal of claim 9, wherein the feedback message further comprises a rank indication (RI), a precoding matrix indicator (PMI), and a channel quality indicator (CQI) associated with the determined CSI-RS resource.

11. The terminal of claim 9, wherein the controller is further configured to, in case that the transmission of the information for identifying the CSI-RS resource is not required, transmit the feedback message including a rank indication (RI), a precoding matrix indicator (PMI), and a channel quality indicator (CQI).

12. The terminal of claim 9, wherein the controller is further configured to:
measure a signal to noise interference ratio (SINR) of the at least one CSI-RS, and
determine the CSI-RS based on the measured SINR of the at least one CSI-RS.

13. A base station in a communication system, the base station comprising:
a transceiver; and
a controller configured to:
transmit, via the transceiver, a configuration message including information on resources for a plurality of channel status information-reference signals (CSI-RSs),
transmit, via the transceiver, at least one CSI-RS based on the information, and
in case that a reception of information for identifying a CSI-RS resource among the resources for the plurality of CSI-RSs is required, receive, via the transceiver, a feedback message including the information for identifying the CSI-RS resource, the CSI-RS resource is determined based on a measurement result of the at least one CSI-RS.

14. The base station of claim 13, wherein the feedback message further comprises a rank indication (RI), a precoding matrix indicator (PMI), and a channel quality indicator (CQI) associated with the determined CSI-RS resource.

15. The base station of claim 13, wherein the controller is further configured to, in case that the reception of the information for identifying the CSI-RS resource is not required, receive the feedback message including a rank indication (RI), a precoding matrix indicator (PMI), and a channel quality indicator (CQI).

16. The base station of claim 13, wherein the CSI-RS resource is determined based on a signal to noise interference ratio (SINR) measurement of the at least one CSI-RS.

* * * * *